United States Patent
Van Beckhoven et al.

(10) Patent No.: US 7,800,996 B2
(45) Date of Patent: Sep. 21, 2010

(54) ROTATION SPEED CONTROL FOR RECORDING INFORMATION

(75) Inventors: Stephanus Josephus Maria Van Beckhoven, Eindhoven (NL); Tony Petrus Van Endert, Eindhoven (NL); Robert Albertus Brondijk, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1579 days.

(21) Appl. No.: 10/521,661

(22) PCT Filed: Jun. 25, 2003

(86) PCT No.: PCT/IB03/02725
§ 371 (c)(1),
(2), (4) Date: Jan. 18, 2005

(87) PCT Pub. No.: WO2004/010430
PCT Pub. Date: Jan. 29, 2004

(65) Prior Publication Data
US 2006/0072899 A1  Apr. 6, 2006

(30) Foreign Application Priority Data
Jul. 22, 2002 (EP) .................................. 02077985

(51) Int. Cl.
*G11B 20/10* (2006.01)
*G11B 19/02* (2006.01)
(52) U.S. Cl. .................. 369/47.39; 369/47.43
(58) Field of Classification Search .............. 369/68, 369/125, 47.39, 47.43, 47.33
See application file for complete search history.

(56) References Cited

U.S. PATENT DOCUMENTS

| | | | | |
|---|---|---|---|---|
| 5,703,850 A | * | 12/1997 | Wada | 369/47.21 |
| 5,844,869 A | * | 12/1998 | Suenaga | 369/30.23 |
| 5,978,338 A | * | 11/1999 | Nakamura | 369/59.19 |
| 5,982,728 A | | 11/1999 | Okamoto et al. | |
| 6,026,068 A | * | 2/2000 | Obata et al. | 369/53.2 |
| 6,031,801 A | | 2/2000 | Ishikawa et al. | |
| 6,088,315 A | | 7/2000 | Ando | |
| 6,333,903 B1 | * | 12/2001 | Suzuki | 369/47.4 |
| 2002/0025138 A1 | * | 2/2002 | Isobe et al. | 386/95 |

FOREIGN PATENT DOCUMENTS

| EP | 0751514 A2 | 1/1997 |
|---|---|---|
| EP | 1152342 A1 | 11/2001 |
| JP | 11306662 | 11/1999 |
| JP | 11306662 A | 11/1999 |
| WO | 9811547 A1 | 3/1998 |
| WO | 9948095 A2 | 9/1999 |

* cited by examiner

*Primary Examiner*—Wayne R Young
*Assistant Examiner*—Aneeta Yodichkas

(57) ABSTRACT

A disc recording device has a mode control unit for switching the device either to a read mode or to a write mode. Reading and writing can be alternated for simultaneous recording and reproducing of video. A rotation speed control unit sets the rotation speed of the record carrier, and has a speed selector for selecting one of at least two speed settings for the read mode in dependence on an actual rotation speed of the record carrier during the write mode when switching from write mode to read mode. By setting the read speed to one of a limited number of settings the difference in rotation speed between said actual rotation speed and the speed in the read mode is limited. Due to the limited differences power dissipation is limited, while the performance of access time and playability of real-life discs is at a high level.

10 Claims, 3 Drawing Sheets

Figure 3:
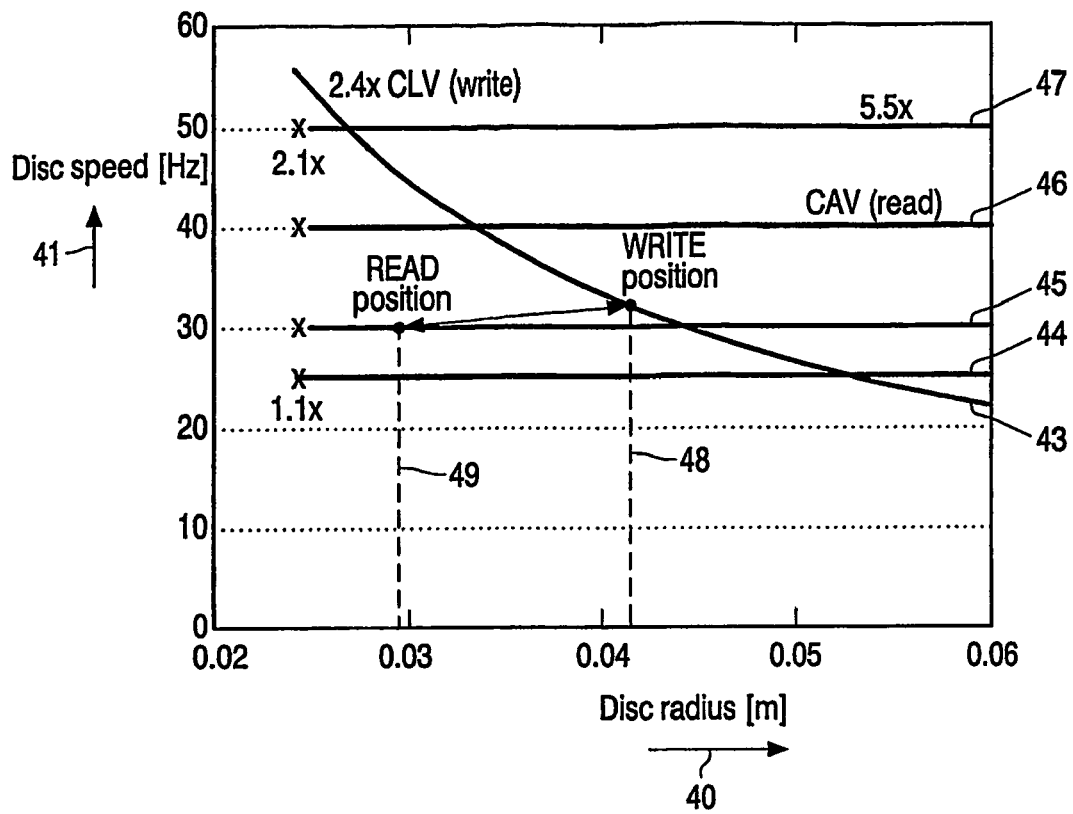

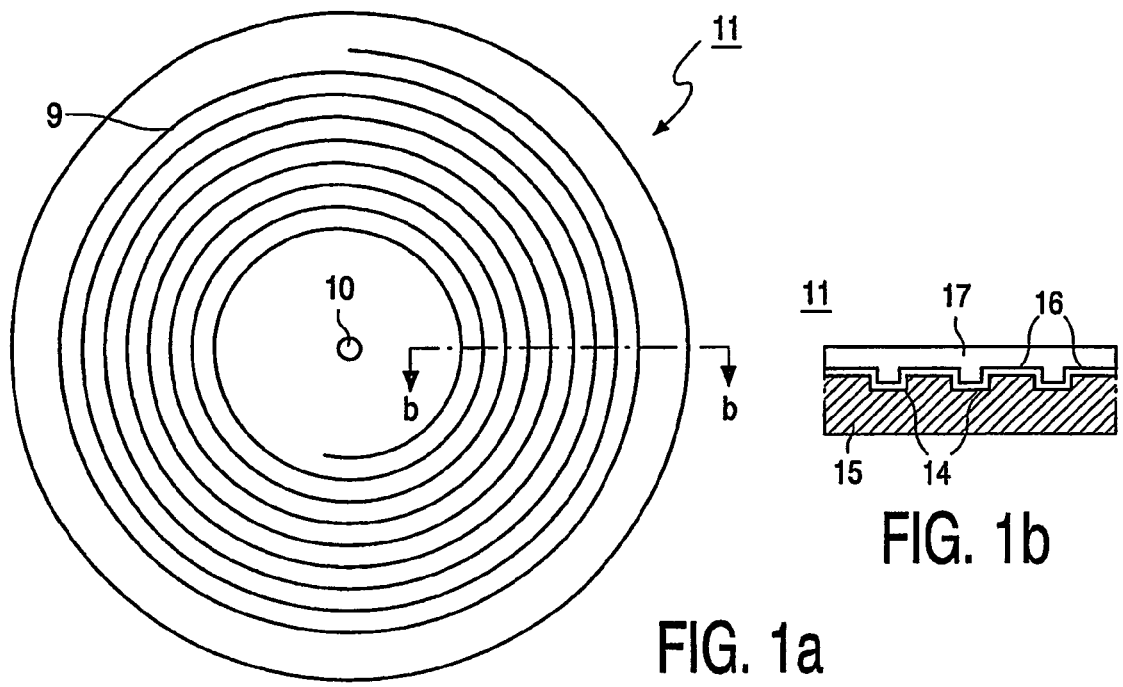
FIG. 1b
FIG. 1a
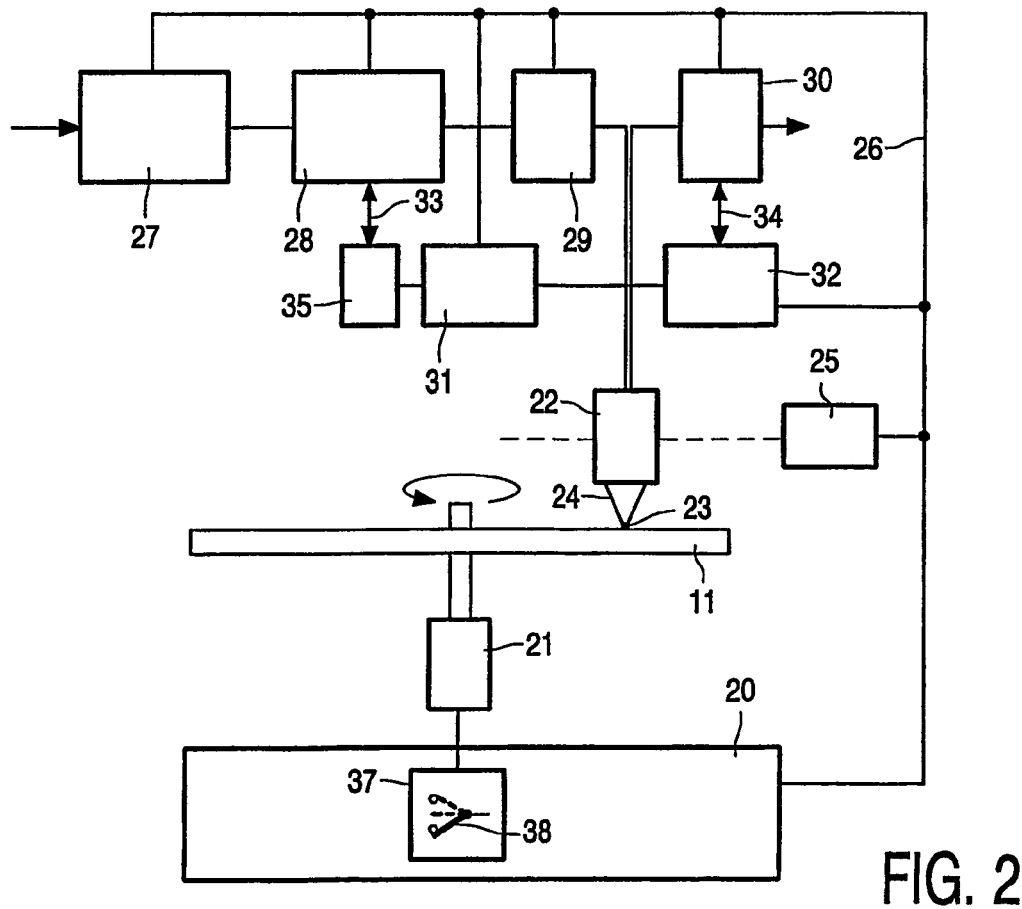
FIG. 2

ROTATION SPEED CONTROL FOR RECORDING INFORMATION

The invention relates to a device for recording information on a disc-shaped record carrier, the record carrier comprising a track for recording information, the device comprising a head for scanning the track, a read unit for retrieving information from the track via the head, a write unit for recording information in the track via the head, a mode control unit for switching the device either to a read mode or to a write mode, and a rotation speed control unit for setting the rotation speed of the record carrier.

The invention further relates to method of controlling a speed of rotation of a disc-shaped record carrier, the record carrier comprising a track for recording information, the method comprising scanning the track via a head, retrieving information from the track via the head, recording information in the track via the head, switching the device either to a read mode or to a write mode, and setting the rotation speed of the record carrier.

A device for recoding information is known from patent application JP11-306662. The device has a head and a write unit for recording information in a track on a record carrier like an optical disc and a read unit for reading information. The device also has a mode control unit for switching the device to a read mode or to a write mode, and a speed control unit for controlling the rotational speed of the record carrier. During the write mode the rotational speed of the record carrier is controlled according to a constant linear velocity (CLV) profile, i.e. the linear speed of the track versus the head is constant and hence the rotational speed of the disc varies in inverse proportion to the radial position of the head. Such a CLV speed profile is common for optical discs like CD-R, DVD+RW or DVD-RW. After a period of writing the mode is switched to the read mode. The information to be read usually is located at a different radial position, and applying the CLV profile also for the read mode would require a change of rotation speed according to the new radial position of the head. In the device the speed control unit sets the rotational speed at a fixed value equal to the actual speed during write mode just before switching. Hence the rotational speed in read mode is the same as the actual speed in the write mode. The rotational speed in read mode is not changed, and therefore the data rate of the information from the track will vary with the radial position. Such speed control is usually called constant angular velocity (CAV). The effect of keeping the same rotation speed when switching from write mode to read mode is that no delay occurs in accessing the data due to speed changes. However the CAV speed profile is not very suitable for use in a high performance rendering device. In particular the read process may be unreliable because of the large range linear speeds occurring due to keeping the same speed when switching from write mode.

Therefore it is an object of the invention to provide a device and method for controlling the rotation speed that is more reliable and suitable for use in a high performance rendering device.

According to a first aspect of the invention the object is achieved with a device as defined in the opening paragraph, characterized in that the rotation speed control unit comprises a speed selector for selecting one of at least two speed settings for the read mode in dependence on an actual rotation speed of the record carrier during the write mode when switching from write mode to read mode, the difference in rotation speed between said actual rotation speed and the speed in the read mode being limited by said selection. According to a second aspect of the invention the object is achieved with a method as defined in the opening paragraph, characterized in that the method comprises selecting one of at least two speed settings for the read mode in dependence on an actual rotation speed of the record carrier during the write mode when switching from write mode to read mode, the difference in rotation speed between said actual rotation speed and the speed in the read mode being limited by said selection. The effect of providing a limited number of settings for the rotational speed is that the device can be designed and tested for optimal performance at the limited range of speeds when reading.

The invention is also based on the following recognition. The known system provides a solution for avoiding delays in access time when switching modes. However the range of speeds during reading can be as large as the difference between the maximum and minimum rotational speed during recording, e.g. a range of about 2.5 times in the CD or DVD system. The inventors have seen that such a large range of speeds requires a complex system design for overall performance at all speeds of the data recording and reading process, in particular during simultaneous recording and retrieving data streams via buffers by alternatingly switching modes. By using a limited number of settings for the rotational speed which are located between the minimum and maximum speed during recording, the complexity of system design is reduced significantly. In particular the testing of the total disc scanning system in the presence of several error sources, usually called playability testing, can be reduced because of the limited number of speeds. Further it has been noted the energy required by the driving motor to change the rotational speed of the disc increases with the square said change. But by providing said limited number of settings the difference in the rotational speed is limited. Hence by limiting the speed differences the energy dissipated in the device for changing speeds is only slightly higher than in the prior art device described above. Further the control unit is less complicated because only a limited number of settings are needed for parameters that depend on the readout speed, for example the gain in the motor control loop.

In an embodiment of the device the speed control unit is arranged for controlling the speed of the record carrier during recording according to a constant linear velocity (CLV) profile. This has the advantage that the linear speed of the head versus the track is constant during the recording process. The recording process usually is more critical regarding design parameters and tolerances against adverse circumstances like dust. Due to the constant speed the recording process can be optimized for this speed.

In an embodiment of the device the speed control unit is arranged for controlling the speed of the record carrier during reading according to a constant angular velocity (CAV) profile. This has the advantage that the rotation speed during reading can be easily set at a fixed value when switching to reading mode.

In an embodiment of the device the speed selector comprises a lowest speed setting for a rotation speed substantially above the lowest rotation speed in the write mode. This has the advantage that the rotation speed during reading never is below the speed of the lowest setting and above the lowest rotation rate during recording. Hence the minimum reading speed which has to be included in the system and buffer design is higher than the lowest recording speed.

In an embodiment of the device the speed selector comprises a highest speed setting for a rotation speed substantially below the highest rotation speed in the write mode. This has the advantage that the rotation speed during reading is within a range which is smaller than the range of rotation speeds during recording. Reading at such rotation speeds may occur at any radial position. Hence the linear reading velocity of the head versus the track during reading is limited.

Further preferred embodiments of the device and server entity according to the invention are given in the further claims.

Figure 5:
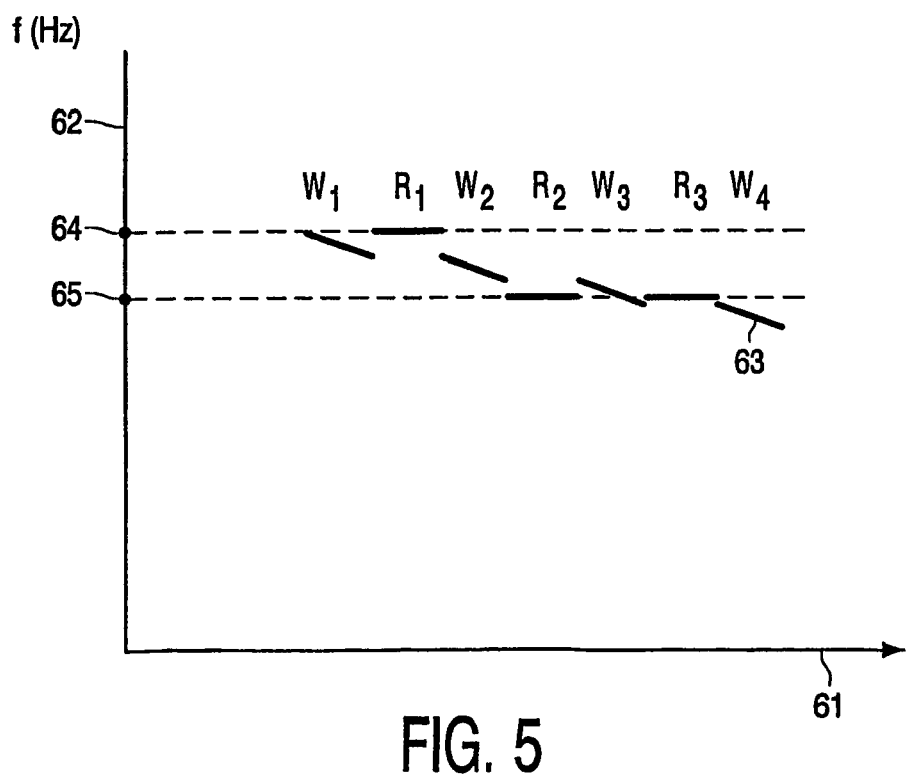
Figure 4:
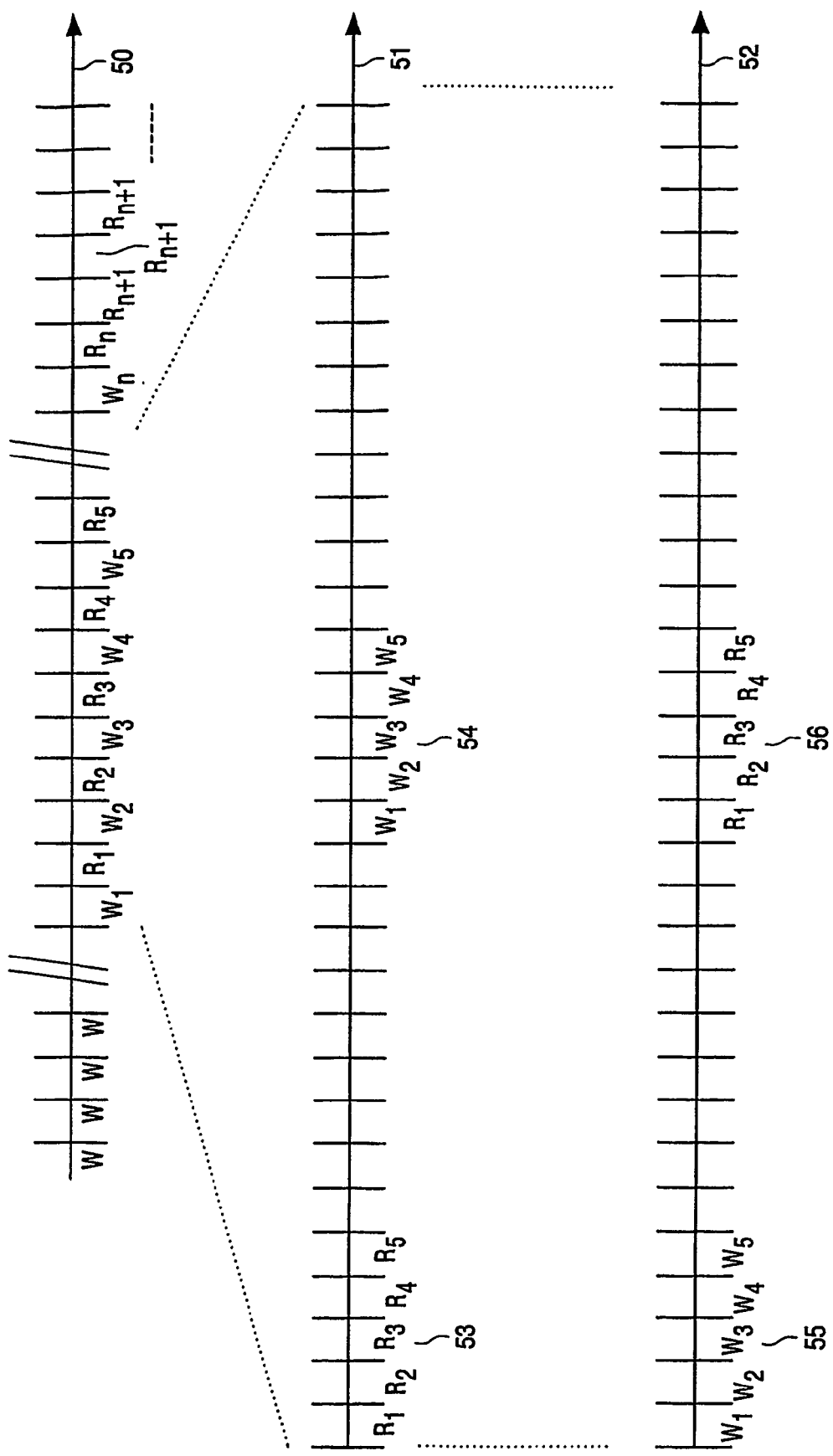

These and other aspects of the invention will be apparent from and elucidated further with reference to the embodiments described by way of example in the following description and with reference to the accompanying drawings, in which FIG. 1a shows a record carrier (top view),
FIG. 1b shows a record carrier (cross section),
FIG. 2 shows a recording device,
FIG. 3 shows speed setting points,
FIG. 4 shows simultaneous recording and retrieving by alternatingly writing and reading, and
FIG. 5 shows rotations speeds during alternatingly writing and reading.

In the Figures, elements which correspond to elements already described have the same reference numerals.

FIG. 1a shows a disc-shaped record carrier 11 having a track 9 and a central hole 10. The track 9, being the position of the series of (to be) recorded marks representing information, is arranged in accordance with a spiral pattern of turns constituting substantially parallel tracks on an information layer. The record carrier may be optically readable, called an optical disc, and has an information layer of a recordable type. Examples of a recordable disc are the CD-R and CD-RW, and writable versions of DVD, such as DVD+RW, and the high density writable optical disc using blue lasers, called Blue-ray Disc (BD). Further details about the DVD disc can be found in reference: ECMA-267: 120 mm DVD—Read-Only Disc —(1997). The information is represented on the information layer by recording optically detectable marks along the track, e.g. crystalline or amorphous marks in phase change material. The track 9 on the recordable type of record carrier is indicated by a pre-embossed track structure provided during manufacture of the blank record carrier. The track structure is constituted, for example, by a pregroove 14 which enables a read/write head to follow the track during scanning. The track structure comprises position information, e.g. addresses, for indication the location of units of information, usually called information blocks. The position information includes specific synchronizing marks for locating the start of such information blocks. The position information is encoded in frames of modulated wobbles as described below.

FIG. 1b is a cross-section taken along the line b-b of the record carrier 11 of the recordable type, in which a transparent substrate 15 is provided with a recording layer 16 and a protective layer 17. The protective layer 17 may comprise a further substrate layer, for example as in DVD where the recording layer is at a 0.6 mm substrate and a further substrate of 0.6 mm is bonded to the back side thereof. The pregroove 14 may be implemented as an indentation or an elevation of the substrate 15 material, or as a material property deviating from its surroundings.

The record carrier 11 may be intended for carrying information representing digitally encoded video according to a standardized format like MPEG2.

FIG. 2 shows a recording device for writing information on a record carrier 11 of a type which is writable or re-writable, for example CD-R or CD-RW, or DVD+RW or BD. The device is provided with recording means for scanning the track on the record carrier which means include a drive unit 21 for rotating the record carrier 11, a head 22, a positioning unit 25 for coarsely positioning the head 22 in the radial direction on the track, and a control unit 20. The head 22 comprises an optical system of a known type for generating a radiation beam 24 guided through optical elements focused to a radiation spot 23 on a track of the information layer of the record carrier. The radiation beam 24 is generated by a radiation source, e.g. a laser diode. The head further comprises (not shown) a focusing actuator for moving the focus of the radiation beam 24 along the optical axis of said beam and a tracking actuator for fine positioning of the spot 23 in a radial direction on the center of the track. The tracking actuator may comprise coils for radially moving an optical element or may alternatively be arranged for changing the angle of a reflecting element. For writing information the radiation is controlled to create optically detectable marks in the recording layer. For reading the radiation reflected by the information layer is detected by a detector of a usual type, e.g. a four-quadrant diode, in the head 22 for generating a read signal and further detector signals including a tracking error and a focusing error signal for controlling said tracking and focusing actuators. The read signal is processed by read processing unit 30 of a usual type including a demodulator, deformatter and output unit to retrieve the information. Hence retrieving means for reading information include the drive unit 21, the head 22, the positioning unit 25 and the read processing unit 30. The device comprises write processing means for processing the input information to generate a write signal to drive the head 22, which means comprise an input unit 27, and modulator means comprising a formatter 28 and a modulator 29. The control unit 20 controls the recording and retrieving of information and may be arranged for receiving commands from a user or from a host computer. The control unit 20 is connected via control lines 26, e.g. a system bus, to said input unit 27, formatter 28 and modulator 29, to the read processing unit 30, and to the drive unit 21, and the positioning unit 25. The control u nit 20 comprises control circuitry, for example a microprocessor, a program memory and control gates, for performing the procedures and functions according to the invention as described below. The control unit 20 may also be implemented as a state machine in logic circuits. The input unit 27 receives the user real-time information and processes the audio and/or video to blocks of information, which are passed to the formatter 28 for adding control data and formatting the data according to the recording format (as described below), e.g. by adding error correction codes (ECC) and/or interleaving. For computer applications units of information may be interfaced to the formatter 28 directly. The formatted data from the output of the formatter 28 is passed to the modulation unit 29, which comprises for example a channel coder, for generating a modulated signal which drives the head 22. Further the modulation unit 29 comprises synchronizing means for including synchronizing patterns in the modulated signal. The formatted units presented to the input of the modulation unit 29 comprise address information and are written to corresponding addressable locations on the record carrier under the control of control unit 20. The control unit 20 is arranged for recording and retrieving position data indicative of the position of the recorded information volumes. During the writing operation, marks representing the information are formed on the record carrier. The marks may be in any optically readable form, e.g. in the form of areas with a reflection coefficient different from their surroundings, obtained when recording in materials such as dye, alloy or phase change material, or in the form of areas with a direction of magnetization different from their surroundings, obtained when recording in magneto-optical material. Writing and reading of information for recording on optical disks and usable formatting, error correcting and channel coding rules are well-known in the art, e.g. from the CD system. The marks can be formed by means of the spot 23 generated on the recording layer via the beam 24 of electromagnetic radiation, usually from a laser diode. In an embodiment the input unit 27 comprises compression means for input signals such as analog audio and/or video, or digital uncompressed audio/video. Suitable compression means are described for video in the MPEG standards, MPEG-1 is defined in ISO/IEC 11172 and MPEG-2 is defined in ISO/IEC 13818. The input signal may alternatively be already encoded according to such standards.

The device has a mode switching unit 31 coupled to the control unit 20 via the system bus 26. The mode switching unit switches the device either to a read mode or to a write mode, in dependence of user commands or automatically for accommodating a number a data streams. The control unit 20 has a rotation speed control unit 37 for setting the rotation speed of the record carrier. In an embodiment the rotation speed during recording is controlled according to a constant linear velocity (CLV) profile, in which profile the speed of the track versus the head is maintained at a constant linear speed. The rotation speed increases in inverse proportion to the radial position as shown in FIG. 3. In an embodiment the rotation speed during reading is controlled according to a constant angular velocity (CAV) profile, in which profile the rotation speed is kept at a constant value, and the data speed increases in proportion with the radial position of the head 22.

The rotation speed control unit 37 includes a speed selector 38 for selecting one of at least two speed settings for the read mode in dependence on an actual rotation speed of the record carrier during the write mode. The actual speed is determined when switching from write mode to read mode under control of the mode switch unit 31. The selector is controlled to select a rotation speed such that the difference in rotation speed between said actual rotation speed and the speed in the read mode is limited by said selection. It is noted that spinning up of the record carrier requires motor power more than proportionally increasing with increasing difference in speed. By using the limited number of setting points the difference in speed is limited. The selecting of set points is described below with reference to FIG. 3.

FIG. 3 shows speed setting points. Along the horizontal axis the disc radial position 40 is indicated. Along the vertical axis the rotation speed 41 is indicated. A first curve for CLV 43 indicates the rotation speed during the recording process. As a practical example the speed of recording is 2.4× the nominal speed of the DVD system. For reading a first setting point 44 at a rotation speed of 25 Hz is indicated as a horizontal line. A second set point 45 is positioned at 30 Hz, a third setting point 46 at 40 Hz and a fifth setting point 47 at 50 Hz. In the example in the fifth setting 47 the linear speed at reading varies between 2.1× and 5.5× the nominal reading speed for the DVD system. The setting of reading speed occurs as follows. According to the mode switch unit 31 the recording process may be interrupted at WRITE position 48. The rotation speed of the record carrier will be around 33 Hz. For reading the closest setting point 45 is selected and the motor is controlled according to the set point of 30 Hz. Reading may start immediately after the head reaches the new radial READ position 49. The jump to this position will take some time, and the motor speed may already be adapted. In an embodiment the reading starts at the new radial READ position 49 before the speed is adapted completely. If an error during reading occurs, the control unit 20 may perform a retry at the same location as soon as the motor speed has been adjusted by again jumping to that position. The number of retries for reading an erroneous location may be increased, because the reading speed has not yet reached its target value.

In an embodiment the speed selector 38 has a lowest speed setting for a rotation speed substantially above the lowest rotation speed in the write mode. As shown in FIG. 3 the lowest speed of recording profile 43 is 22 Hz. The lowest rotation rate setting point is 25 Hz, which increases the minimum speed at reading by circa 15% compared to a setting of 22 Hz. In an embodiment the speed selector 38 has a highest speed setting at 50 Hz, while the maximum rotation speed during recording according to the CLV profile at 2.4× nominal DVD speed is 55 Hz. The highest rotation speed during reading is 10% lower than the maximum rotation speed during recording. Hence the maximum linear speed for reading is limited to around 5.5× DVD. Using the same speed as the maximum recording speed would have resulted in a maximum linear reading speed of over 6×.

In an embodiment at least a number of the speed settings are at rotation speeds having a predefined rotation frequency interval. The interval may be equal for a number of settings. As shown in FIG. 3 there are setting points 45, 46, 47 at the interval of 10 Hz. Keeping the interval at the same value results in a maximum speed difference of half the interval, e.g. 5 Hz. However the interval may also be chosen according to other design criteria, e.g. the interval being smaller at higher rotation speeds for creating a substantially equal response time for speeding up to each of the settings setting. In an embodiment the speed control unit 37 is arranged as shown in FIG. 3 for accommodating a write rotation speed range for recording in which range the highest speed is substantially 2.5 times the lowest speed, and the speed selector is arranged for selecting one of 4 speed settings for the read mode.

In an embodiment the device has a write buffer 35 for storing information to be recorded, and wherein the mode control unit 31 is arranged for switching the modes in dependence on a filling degree of the write buffer 35. The mode control unit 31 is arranged for recording the input stream of real-time information via the write buffer and for, at the same time, retrieving of real-time information by alternating the write mode and the read mode. The writing continues until the write buffer is substantially empty. The mode control unit 31 detects the filling degree and switches to read mode. Usually also a read buffer 32 is available. The read process continues until the write buffer is substantially full, or alternatively until the read buffer is substantially full. The buffer sizes are chosen so that switching between data streams to be recorded and retrieved simultaneously does not occur too often, as this would cause wear and audible noise. A practical value for the switch cycle is 3 to 10 seconds, for example 5 seconds write, 0.5 second for a jump, 4 seconds read and again 0.5 second for a jump. At a data rate of the data stream of about 5 Mbit/sec the write buffer 35 needs to be about 4 Mbyte.

FIG. 4 shows simultaneous recording and retrieving by alternatingly writing and reading. The upper diagram 50 shows along a time axis the writing of data by $W_n$ wherein the index n indicates the order in time. On a first segment of the axis a writing action takes place indicated by W. In the middle segment there are shown alternating writing and reading actions $W_1$ to $W_5$ and $R_1$ to $R_5$. The middle diagram 51 schematically shows a first example of the writing and reading actions on two radial positions, reading position 53 being more inward and writing position 54 being more outward. The lower diagram 52 schematically shows a second example of the writing and reading actions on two radial positions, writing position 55 being more inward and reading position 56 being more outward.

FIG. 5 shows rotations speeds during alternatingly writing and reading.

Along the horizontal axis 61 the time indicated, along the vertical axis 62 the rotation speed of the disc. The writing actions $W_1$, $W_2$ and $W_3$ are suppose to take place in successive radial positions and therefore are shown to have the a decreasing writing rotation rate 63 according to the CLV profile. The first reading action $R_1$ takes place at a more inward position at a slightly higher first rotation speed selection 64, while the second and third reading actions $R_2$ and $R_3$ take place at a slightly lower second rotation speed selection 65. The rotation speed selections 64, 65 are selected based on the actual rotation rate 63 during writing. Hence the difference between the rotation rate during writing and the rotation rates during reading is limited. If always the closest reading speed is selected, the maximum difference is half the interval between rotation rate settings 64, 65.

Although the invention has been mainly explained by embodiments using optical discs for storing video, the invention is also suitable for other disc type record carriers such as magnetic discs or any other rendering device for any type of information that uses differing speeds for reading and recording of information. It is noted, that in this document the word 'comprising' does not exclude the presence of other elements or steps than those listed and the word 'a' or 'an' preceding an element does not exclude the presence of a plurality of such elements, that any reference signs do not limit the scope of the claims, that the invention may be implemented by means of both hardware and software, and that several 'means' or 'units' may be represented by the same item of hardware or software. Further, the scope of the invention is not limited to the embodiments, and the invention lies in each and every novel feature or combination of features described above.

The invention claimed is:

1. A device for recording information on a disc-shaped record carrier, the record carrier comprising a track for recording information, the device comprising:
   a head for scanning the track;
   a read unit for retrieving information from the track via the head;
   a write unit for recording information in the track via the head;
   a mode control unit for switching the device either to a read mode or to a write mode; and
   a rotation speed control unit for setting the rotation speed of the record carrier,
   wherein the rotation speed control unit comprises a speed selector for selecting one of at least two speed settings for the read mode in dependence on an actual rotation speed of the record carrier during the write mode when switching from write mode to read mode, the difference in rotation speed between said actual rotation speed and the speed in the read mode being limited by said selection.

2. The device as claimed in claim 1, wherein the speed control unit controls the speed of the record carrier during recording according to a constant linear velocity (CLV) profile.

3. The device as claimed in claim 1, wherein the speed control unit controls the speed of the record carrier during reading according to a constant angular velocity (CAV) profile.

4. The device as claimed in claim 1, wherein the speed selector comprises a lowest speed setting for the read mode for a rotation speed substantially above the lowest rotation speed in the write mode, and/or a highest speed setting for read for a rotation speed substantially below the highest rotation speed in the write mode.

5. The device as claimed in claim 3, wherein at least a number of the speed settings are at predefined rotation frequencies having at least one predefined rotation frequency interval.

6. The device as claimed in claim 1, wherein the speed control unit accommodates a write rotation speed range for recording in which the highest speed is substantially 2.5 times the lowest speed, and the speed selector selects one of 4 speed settings for the read mode.

7. The device as claimed in claim 1, wherein the device further comprises a write buffer for storing information to be recorded, and wherein the mode control unit switches the modes in dependence on a filling degree of the write buffer.

8. The device as claimed in claim 7, wherein the device comprises a video encoding unit for receiving video data and providing encoded video as information to be recorded via the write buffer.

9. The device as claimed in claim 7, wherein the mode control unit controls the write unit to record a first continuous stream of real-time information via the write buffer, at the same time, controls the read unit to retrieve a second stream of real-time information by alternating the write mode and the read mode.

10. A method of controlling a speed of rotation of a disc-shaped record carrier, the record carrier comprising a track for recording information, the method comprising the steps of:
    scanning the track via a head;
    retrieving information from the track via the head;
    recording information in the track via the head;
    switching the device either to a read mode or to a write mode; and
    setting the rotation speed of the record carrier,
    wherein the step of setting the rotations speed of the record carrier comprises selecting one of at least two speed settings for the read mode in dependence on an actual rotation speed of the record carrier during the write mode when switching from write mode to read mode, the difference in rotation speed between said actual rotation speed and the speed in the read mode being limited by said selection.

* * * * *